J. A. BALL.
DISINTEGRATING HOPPER FOR DREDGERS AND EXCAVATORS.

No. 285,340. Patented Sept. 18, 1883.

WITNESSES
John H. Redstone
Frank R. Bram

INVENTOR
John A. Ball

UNITED STATES PATENT OFFICE.

JOHN A. BALL, OF OAKLAND, CALIFORNIA.

DISINTEGRATING-HOPPER FOR DREDGERS AND EXCAVATORS.

SPECIFICATION forming part of Letters Patent No. 285,340, dated September 18, 1883.

Application filed July 23, 1879.

*To all whom it may concern:*

Be it known that I, JOHN A. BALL, of Oakland, in the county of Alameda and State of California, have invented certain new and useful Improvements in Disintegrating-Hoppers for Dredgers and Excavators, of which the following is a specification.

My invention relates to dredging-machines adapted to discharge or convey the mud or material raised thereby to the point of delivery.

My invention has for its object to cause the mud or material dropped into a suitable box or hopper and mixed with a proper amount of water to travel by reason of its own gravity, weight, or pressure from the said hopper through a connected closed discharge-pipe to the point where the mud or material is to be deposited or delivered; and, as herein shown, the entrance of the mud into the discharge-pipe is facilitated by the force of a stream of water coming into the hopper from the supply-pipe, shown as connected with a pump.

My invention consists in an apparatus to dredge and carry mud or dredge material to the desired point of delivery, having mechanism adapted to raise tenacious mud or other material, and to deliver the material into a hopper, a hopper elevated above the point of delivery of the mud therefrom, and a pipe connected to a force-pump and adapted to cause a stream of water to strike and cut up the mud or dredged material which falls in the hopper, combined with a closed discharge-pipe, the upper end of which is connected with the said hopper, whereby the material thrown into the said hopper and introduced into the discharge-pipe is delivered therefrom by its own weight or gravity, substantially as will be described; also, in a dredging and conveying apparatus, an elevated hopper, dredging and elevating mechanism for raising mud or other material and delivering it therein, a closed discharge-pipe for conveying the material from the hopper to the point of delivery lower than the hopper, and a pipe connected to a force-pump and adapted to introduce a jet of water to strike and cut up the said mud as it drops and enter it into the said discharge-pipe, along and from which it flows by reason of its own weight and gravity, substantially as will be described.

Figure 1:
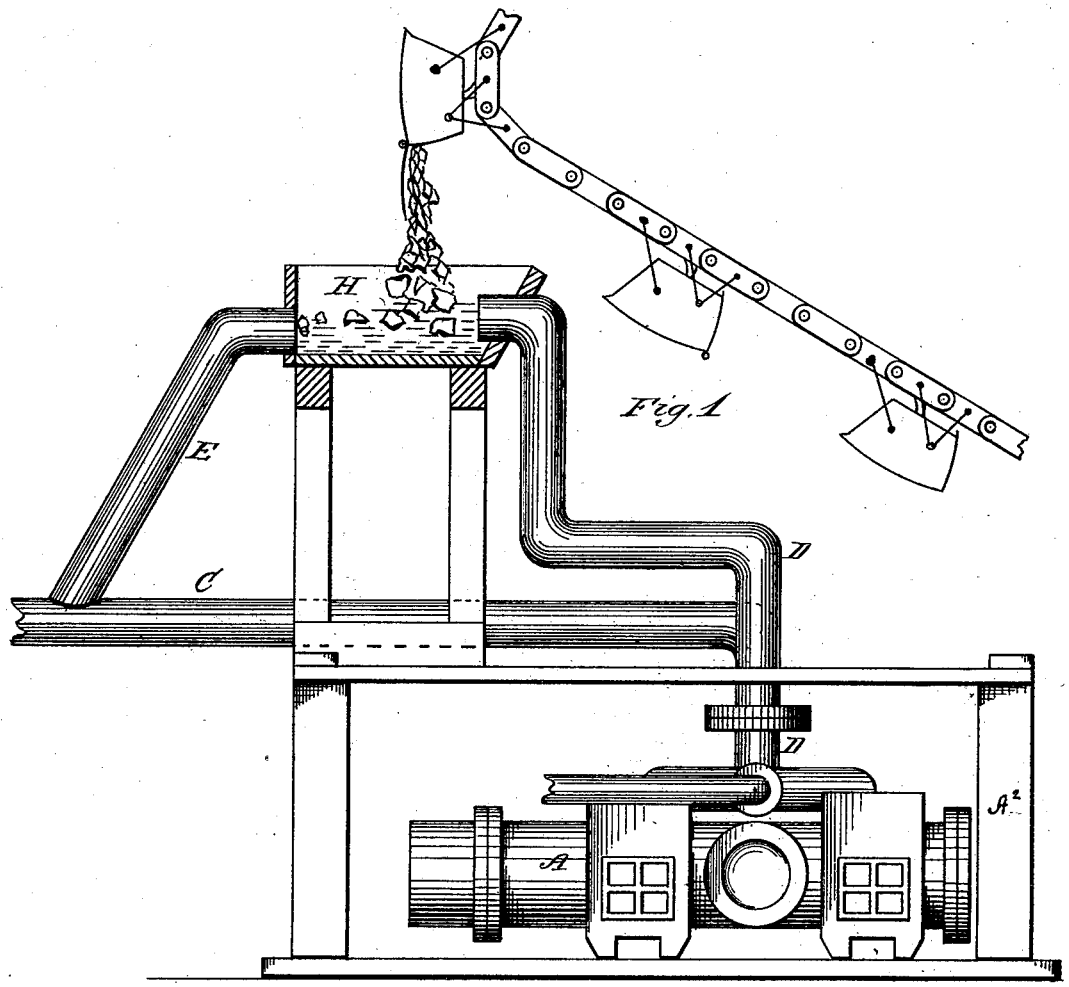
Figure 2:
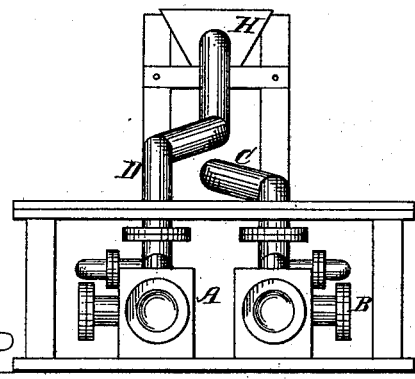

Figure 1 is a side elevation of a sufficient portion of a dredge to enable one skilled in the art to construct the same, and Fig. 2 an end elevation thereof.

In the drawings, $A^2$ represents a part of the dredge-frame, of usual or suitable construction to sustain the working parts. The frame-work has supports for the hopper H, into which ordinary lifting-buckets, C, carried by a chain, deposit mud or dredge material, the buckets herein shown being as shown and described in United States Patent heretofore granted to me, No. 236,138, to which reference may be had. A discharge-pipe, $E E^2$, open only at its ends, leads from the said hopper down outside of the dredger, and thence to the point of delivery, or to the point where the mud or dredge material is to be discharged. The upper end of the discharge-pipe E is connected with one end of the hopper H, of suitable shape, near its floor or bottom, and at the opposite side of the hopper, and preferably substantially on line with the upper end of the discharge-pipe, or a little higher than it, is placed the open end of the water-supplying pipe D, which is supplied with water under sufficient pressure by the pump A, the latter being a hydraulic pump of usual construction. The mud dropped into the hopper from the buckets is acted upon by the stream of water driven out through the supply-pipe D with a force sufficient to cut up or disintegrate the same, the force of the stream of water, and the location of the mouth of the pipe D, and the receiving end of the discharge-pipe $E E^2$ with relation to each other being as shown and such as to facilitate the driving or entrance of the mud into the open end of the discharge-pipe, from whence it flows, as described, to the place of deposit, or where it is to be discharged. It will be noticed and understood that the hopper is located at such height above the part $E^2$ of the discharge-pipe $E E^2$ as to enable the weight and pressure of the mud and water coming into the elevated part E of the said discharge-pipe from the hopper H to act by its own gravity to force the mud along and through the lower portion, $E^2$, of the discharge-pipe to its point of delivery lower than the hopper, or lower than the upper end of the portion E of the said discharge-pipe. The jet or stream of water issuing from the pipe D, besides cutting up the mud as it enters the hopper, reduces the same to proper consistency to flow or be carried through the discharge-pipe, and by its force tends to cause it to enter the mouth of the said discharge-pipe.

In the drawings I have shown a pipe, C, leading from a second pump, B, to the lower end of the part E of the mud-discharge pipe, which may be used to force water into the discharge-pipe to aid the movement of the mud, if desired; but I do not claim the pipe C or its combination with the discharge-pipe and the pump B, and in practice there is no occasion for its use, inasmuch as the combined weight of mud and water in the discharge-pipe is sufficient to cause the mud to be moved forward therein in the direction of the arrow, and to be discharged from the portion E² of the discharge-pipe by its own pressure due to gravity.

I am aware that a pump in connection with a dredger and conveying-pipe continuous with the pump, and the whole being adapted to pump the mud directly from the bottom and to force it through the pipe, is not new, and I do not broadly claim such an apparatus; nor do I claim the conveying of mud or similar material mixed with water through pipes.

I claim—

1. In a dredging and conveying apparatus, an elevated hopper, dredging mechanism adapted to raise tenacious mud or other material and deliver it therein, a discharge-pipe for conveying the material from the hopper to the point of delivery lower than the hopper, and a pipe connected to a force-pump and adapted to cause a stream of water to strike and cut up the mud or dredge material which falls in the hopper and render it sufficiently liquid to flow through the said discharge-pipe by its own gravity, substantially as described.

2. In a dredging and conveying apparatus, an elevated hopper, dredging mechanism adapted to raise tenacious mud or other material and deliver it therein, a discharge-pipe for conveying the material from the hopper to the point of delivery lower than the hopper, and a water-supply pipe in connection with a force-pump, the outlet of the said water-supply pipe being located opposite the entrance of the discharge-pipe, said pipe being adapted to cause a stream of water to strike and cut up the material as it falls in the hopper, and to carry the same into the discharge-pipe, substantially as shown and described, through which discharge-pipe it flows by its own weight or gravity, as set forth.

JOHN A. BALL.

Witnesses:
JOHN H. REDSTONE,
FRANK R. BRAUN.